(12) United States Patent
Stamenkovic

(10) Patent No.: US 6,435,006 B1
(45) Date of Patent: Aug. 20, 2002

(54) METHOD FOR THE PNEUMATIC MEASUREMENT OF LENGTHS

(75) Inventor: Milan Stamenkovic, Gerlingen (DE)

(73) Assignee: Stotz Feinmesstechnik GmbH, Gerlingen (DE)

( * ) Notice: Subject to any disclaimer, the term of this patent is extended or adjusted under 35 U.S.C. 154(b) by 0 days.

(21) Appl. No.: 09/269,990

(22) PCT Filed: Aug. 6, 1998

(86) PCT No.: PCT/EP98/04915

§ 371 (c)(1),
(2), (4) Date: Jun. 25, 1999

(87) PCT Pub. No.: WO99/08069

PCT Pub. Date: Feb. 18, 1999

(30) Foreign Application Priority Data

Aug. 6, 1997 (DE) .......................... 197 33 984

(51) Int. Cl.[7] .............................. G01B 13/08; G01B 3/22
(52) U.S. Cl. ............................ 73/37.5; 33/837
(58) Field of Search .................. 73/37, 37.5; 33/837, 33/655, 517; G01N 13/02

(56) References Cited

FOREIGN PATENT DOCUMENTS

| DE | 2921989 | * | 4/1980 | ........... G01B/13/12 |
| DE | 4200401 | * | 7/1993 | ........... G01B/13/02 |
| EP | 0671599 | * | 3/1995 | ........... G01B/5/00 |

* cited by examiner

*Primary Examiner*—Hezron Williams
*Assistant Examiner*—J L P
(74) *Attorney, Agent, or Firm*—Townsend and Townsend and Crew LLP

(57) ABSTRACT

The invention relates to a method for measuring lengths pneumatically. According to the invention, the medium used for measuring is conducted through a front nozzle and a measuring nozzle, onto a deflection plate. The distance of the deflection plate from the measuring nozzle is determined from the change in pressure $p_2$ occurring between the front nozzle and the measuring nozzle. The pressure $p_1$ in front of the front nozzle is also measured and the length value resulting from the pressure measurement between the front nozzle and the measuring nozzle is corrected according to said pressure $p_1$. This ensures that a high level of measuring accuracy can be achieved using a small quantity of compressed air.

7 Claims, 9 Drawing Sheets

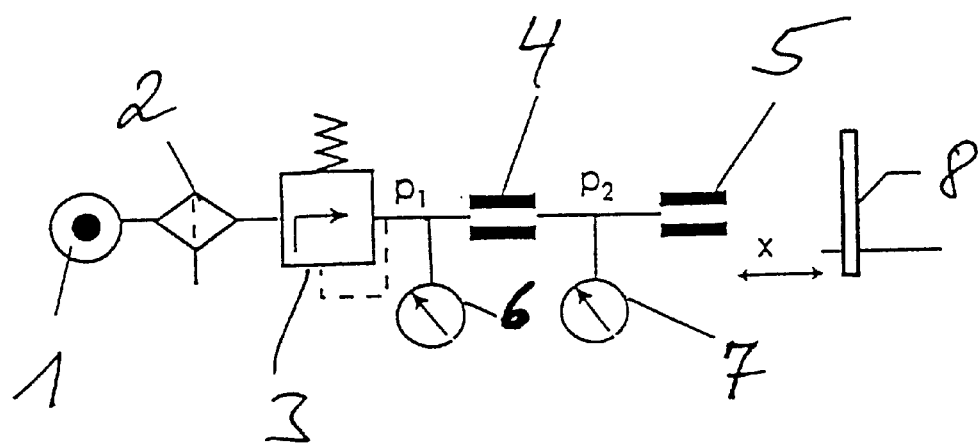
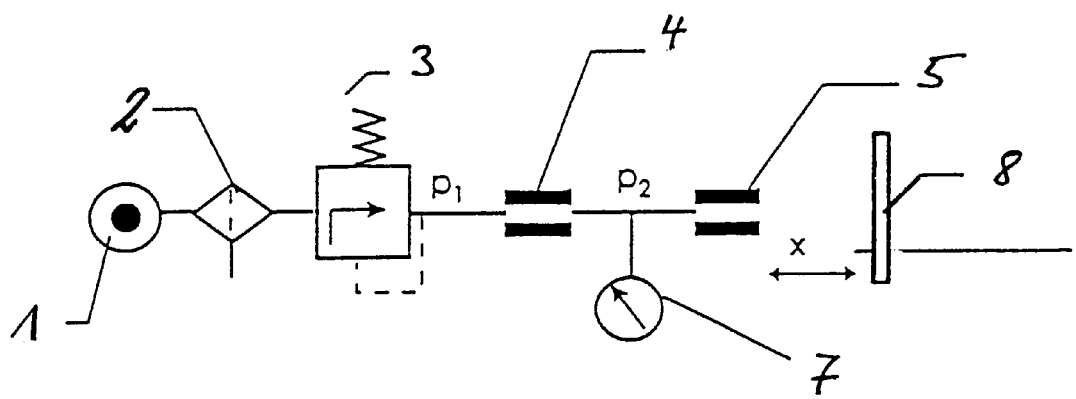

METHOD FOR THE PNEUMATIC MEASUREMENT OF LENGTHS

BACKGROUND OF THE INVENTION

1. Field of the Invention

The present invention relates to a method for pneumatic length measurement in which the medium used for the measurement is directed through a pre-nozzle and a measuring nozzle onto an impact plate and the spacing of the impact plate from the measurement nozzle is determined from a change of the pressure $p_2$ between the pre-nozzle and the measurement nozzle.

2. Description of the Prior Art

Methods for pneumatic length measurement have been known for a long time and are in particular used in the manufacture of workpieces because of the high measurement accuracy, the rapid determination of the measured value and the insensitivity of the measurement method with respect to external influences.

A disadvantage of this method lies in the fact that the supply pressure of the measurement apparatus must be constant in order to be able to guarantee an adequate measurement accuracy. So-called bridge circuits are thus also known, in which the pressure is measured between a measurement branch and a reference branch. Because air pressure fluctuations of the supply pressure act equally on the reference branch and on the measurement branch, these fluctuations are compensated. The disadvantage of the bridge circuit, however, lies in the fact that twice the quantity of air is consumed through the reference branch. Moreover, the manufacturing costs and the complexity of the adjustment are increased by the reference branch.

SUMMARY OF THE INVENTION

The invention is based on the object of setting forth a pneumatic method of length measurement of the initially named kind, which has a high measurement accuracy despite fluctuations of the supply pressure and which, at the same time, enables a low consumption of compressed air and low manufacturing costs.

This object is solved in that the pressure $p_1$ in front of the pre-nozzle is additionally measured and the length value resulting from the pressure measurement between the pre-nozzle and the measurement nozzle is corrected in dependence on the pressure $p_1$.

In accordance with the invention a correction of the pressure measured between the pre-nozzle and the measurement nozzle of the measurement branch, i.e. of the length value derived therefrom, is effected instead of a bridge circuit. The correction takes place in this respect in dependence on the additionally measured pressure $p_1$ before the pre-nozzle. This additionally measured pressure $p_1$ is a measure of the fluctuations of the air supply pressure and can thus be used for the correction. However, the correct length value cannot be precisely calculated from the additionally measured pressure $p_1$. An approximation function is, however, sufficient as a correction in order to increase the measurement accuracy in the desired manner.

In accordance with one embodiment of the invention, the following function is used to calculate the length instead of the pressure $p_2$:

$$f(p_1, p_2) = \alpha p_1 - p_2$$

wherein a is a basically freely selectable constant. Through this approximation function a considerable improvement of the measured values is already achieved. It is preferred if a suitable value for a is determined by measurement of the pressures $p_1$ and $p_2$ at, in each case, two different air supply pressures A and B and by calculation of ac in accordance with the formula:

$$\alpha = \frac{P_{2B} - P_{2A}}{P_{1B} - P_{1A}}$$

wherein $P_{1A} \ldots p_1$ at air supply pressure A
$P_{1B} \ldots p_1$ at air supply pressure B
$P_{2A} \ldots p_2$ at air supply pressure A
$P_{2B} \ldots p_2$ at air supply pressure B
is determined. It has been shown that a high measurement accuracy is achievable herewith.

In accordance with a further embodiment of the invention, the two air supply pressures A and B are selected symmetrically to a desired air pressure, in particular to the intended air pressure, for the determination of $\alpha$. The measurement is executed at the desired spacing $X_0$ of the measurement nozzle. Through this design it is ensured that the highest measurement accuracy is achieved in the region of the intended air pressure and of the desired distance. A change of the desired distance can in this respect be realized simply by a change of $\alpha$. That is to say, a zero point shift for the adjustment of the measuring apparatus can be effected via a: without mechanical changes at the measurement apparatus.

In accordance with a further embodiment of the invention, the correction is carried out in accordance with the formula:

$$x_e = x - \gamma \Delta p \Delta x$$

where $\Delta p = p_1 - P_0$ and $\Delta x = x - X_0$, with
$x_e \ldots$ being the corrected length value
$x \ldots$ being the length value calculated from $p_2$
$\gamma \ldots$ being a basically arbitrarily selectable constant.

Through this embodiment an even higher accuracy of the measured values can be achieved, in particular with larger air pressure fluctuations and larger deviations of the distance from the desired value.

In accordance with a further embodiment of the invention, a suitable value for $\gamma$ is determined by determination of the indicated length value at, in each case, two different distances set by differing measurement and at two different pressures $p_1$ and by calculation of $\gamma$ in accordance with the formula:

$$\gamma = \frac{X_{2Ph} - X_{2P0}}{(P_h - P_0)(X_{2Ph} - X_{0P0})}$$

with
$X_{2Ph} \ldots$ being the indicated length value at a distance $X_2$ and pressure $P_h$
$X_{2P0} \ldots$ being the indicated length value at a distance $X_2$ and pressure $P_0$
$X_0P_0 \ldots$ being the indicated length value at a distance $X_0$ and pressure $P_0$.

It has been shown that particularly precise measurement values can be achieved with this $\gamma$ value.

In accordance with a further design of the invention, $X_0$ is selected as the desired spacing, and $P_0$ as the desired pressure. Through this embodiment the highest accuracy is advantageously achieved at the desired spacing and at the desired pressure.

In accordance with a further embodiment of the invention, $p_1$ and $p_2$ can be calibrated values of the pressure sensors before the pre-nozzle and between the pre-nozzle and the measurement nozzle. In accordance with another design, $p_1$ and $p_2$ can be uncalibrated values of these pressure sensors, and in particular their voltage values v and u.

When using uncalibrated pressure values the calculation of the corrected length value takes place in accordance with a further embodiment of the invention, preferably in accordance with the formula:

$$x_e = X_1 + (f_e(v, u) - F_1)\frac{X_2 - X_1}{F_2 - F_1},$$

wherein $f_e(v, u) = f(v, u) - \gamma \Delta v \Delta f(v, u)$ $\Delta v = v - V_0$ $\Delta f(v, u) = v\alpha - u - F_0$ $F_1 = f_e(v, u)$ at a distance $x = X_1$ and $F_2 = f_e(v, u)$ at a distance $x = X_2$ with $x_e$ ... being the corrected length value v ... being the uncalibrated value of the pressure sensor before the pre-nozzle u ... being the uncalibrated value of the pressure sensor between the pre-nozzle and the measurement nozzle.

With this formula a very precise measurement value can be calculated without the calibrated pressure sensors being necessary. Accordingly, cost saving, uncalibrated pressure sensors can be used for the measurement apparatus.

BRIEF DESCRIPTION OF THE DRAWINGS

FIG. 1 illustrates a measurement arrangement for carrying out the method of the invention, FIG. 2 illustrates a customary network without a bridge.

DESCRIPTION OF SPECIFIC EXEMPLARY EMBODIMENTS

Figure 3A:
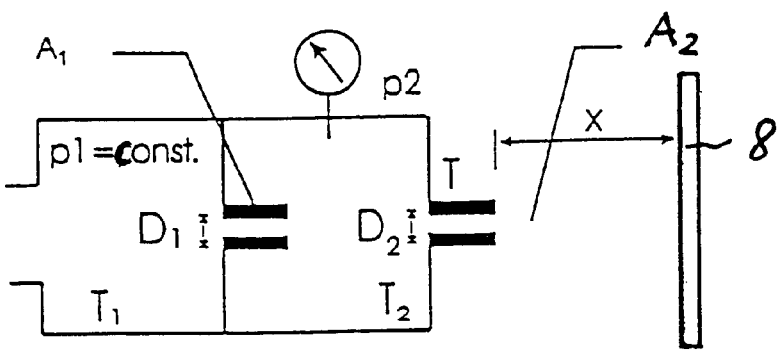
FIG. 3a illustrates the layout of a customary pneumatic length measurement system, which has to be fed with a stable air supply pressure.

The measurement arrangement shown in FIG. 1 includes a pressure source 1, a filter 2, a pressure regulator 3, a pre-nozzle 4 a measurement nozzle 5, a first pressure sensor 6 arranged before the pre-nozzle 4 and a second pressure sensor 7 arranged between the pre-nozzle 4 and the measurement nozzle 5. An impact plate 8 representative for a workpiece to be measured is shown in front of the air outlet opening of the measurement nozzle 5.

In the following the relationships in customary pressure measurement methods and in the pressure measurement method of the invention will be explained once again in detail, with special embodiments being used for the explanation of the invention.

1. Introduction

In the 70-year development history of the air pressure measurement method, a plurality of variants arose, of which the most important are nowadays summarized in DIN 2271 [1]. The important advantages of the pneumatic length measurement technique are: simple mechanical design, no movable parts (measurement probe/measurement lever), self-cleaning of the measurement location, contact-free sensing, small dimensions of the measurement means (measurement nozzles), high accuracy with the resolution above 0.1 $\mu$m [3, 4, 8].

As a result of the advantages listed, a widespread use of the pneumatic measurement principle took place in past years. The high measurement accuracy, rapid detection of the measured value and insensitivity of the measurement method with respect to external influences (chips, emulsions, contamination) are greatly appreciated, particularly in manufacturing [2, 3, 5, 7].

A general disadvantage of modern pneumatic measurement lies in the fact that the supply pressure of the measurement apparatus must be constant. Embodiments without a pneumatic bridge (for example throughflow measurement methods, speed measuring methods and pressure pressuring methods [1, 7, 9]) are particularly affected. In order to guarantee a measurement accuracy in the $\mu$m range, air pressure fluctuations are permitted in the small mbar range between the supply unit and the measurement apparatus. In order to be able to guarantee constant air pressure conditions within pneumatic measurement instruments, a compensation bridge has to be added. This in turn caused higher manufacturing costs and increased the compressed air consumption of the measurement instrument.

In this manuscript a new embodiment of the pneumatic high pressure measurement method of DIN 2271 is described. The pneumatic length measurement method portrayed here achieves a measured value which is stable against the fluctuations of the air supply pressure, even without a pneumatic bridge. The pneumatic bridge is replaced by an additional air pressure sensor, with which the actual air supply pressure is measured. The actual measured value is thereby continually corrected. The derivation of the compensation calculation will be explained with reference to a computational example.

2. Theoretical Principles of the Pressure Measurement Method

Pneumatic measurement instruments are divided into two groups. This classification takes account of the supply pressure of the individual measurement instrument. For low pressure measurement instruments, the supply pressure amounts to $\leq 0.1$ bar, and for high pressure measurement instruments the supply pressure lies at $\geq 0.5$ bar. At this point the characteristics of the pneumatic networks for high pressure measurement methods will be described.

2.1 Network Without Bridge

The basic layout of a pneumatic length measurement system, which operates in accordance with the pressurized air measurement method, is shown in FIG. 2. The supplied air is cleaned by a filter and set constant with the aid of an air pressure regulator. At a stable input pressure $p_1$ the area ratio $A_2/A_1$ (measurement nozzle/measurement pre-nozzle) essentially influences the airflow and thereby the measurement pressure $p_2$, which is indicated by a manometer.

A precise calculation of the measurement pressure $p_2$ in dependence on the gap x is made more difficult by the compressibility of the air, friction losses and heat exchange [2, 6, 9]. To a first approximation it can be assumed that the flow takes place with an adiabatic process, i.e. the heat exchange can be ignored ($T_1=T_2$=constant; see FIG. 3). The areas or cross-sections are calculated in accordance with the following formulae:

$$A_1 = D_1^2 \pi/4; \quad A_2 = D_2 x \tag{1}$$

wherein $D_1$ and $D_2$ are the smallest diameter of the pre-nozzle and the measurement nozzle. The theoretical measurement range is limited by the diameter of the measurement nozzle, i.e. $x_{max}=D_2/4$.

Figure 3B:
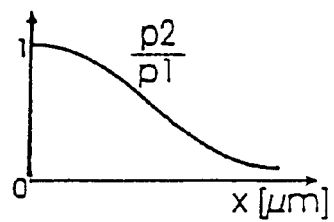
FIG. 3b illustrates the named characteristic $p_2/p_1$.

The geometry of the pre-nozzle and measurement nozzle, together with the selected feed pressure $p_1$ and the measurement pressure $p_2$, play a decisive role for the numerical size of the outflow and the energy losses. Accordingly, the nozzles are frequently rounded at the inlet [7, 9], i.e. the flow passage of the pre-measurement nozzle has almost the shape of a Laval nozzle [9]. The normalized characteristic with respect to the supply pressure is shown in FIG. 3b. If the measurement nozzle is pressed closed by an impact plate (x=0), the measurement pressure P2 is the same as $p_1$.

An enlargement of the gap beyond a quarter of the measurement nozzle diameter results in practically no change of the measurement pressure $p_2$ (normally the measurement nozzle ends with the narrowest cross-section).

On the assumption that the cross-sections of the supply lines for the pre-nozzles and measurement nozzles are adequately large and that $T_1=T_2$ is the same, the same quantity of air flows through the pre-nozzle and measurement nozzle in the stationary state. Thus, the following equation can be drawn up [9]:

$$\frac{x}{x_{max}} \frac{A_{2max}}{A_{1min}} = \frac{\alpha_1}{\alpha_2} \frac{p_1}{p_2} \frac{\sqrt{\left(\frac{P_{1min}}{P_1}\right)^{\frac{2}{\kappa}} - \left(\frac{P_{1min}}{P_1}\right)^{\frac{\kappa+1}{\kappa}}}}{\sqrt{\left(\frac{P_{2min}}{P_2}\right)^{\frac{2}{\kappa}} - \left(\frac{P_{2min}}{P_2}\right)^{\frac{\kappa+1}{\kappa}}}} \tag{2}$$

wherein: $\kappa=1.4$; $A_{2max}=D_2^2\pi/4$; $\alpha_1$ and $\alpha_2$ are outflow figures from the pre-nozzle and measurement nozzle; $A_{1min}$ is the narrowest measurement nozzle cross-section (approximated $A_{1min}=A_1$); $p_{1min}$ and $p_{2min}$ are the pressures in the narrowest cross-sections of the pre-nozzle and measurement nozzle.

For a feed pressure $p_1$ between 2.5 and 3.2 bar the equation (2) can be simplified:

$$x = x_{max} \frac{A_1 \alpha_1 p_1}{A_{2max} \alpha_2 p_2} \frac{1}{0,26} \sqrt{\left(\frac{p_2}{p_1}\right)^{\frac{2}{\kappa}} - \left(\frac{p_2}{p_1}\right)^{\frac{\kappa+1}{\kappa}}} \tag{3}$$

Figure 4:
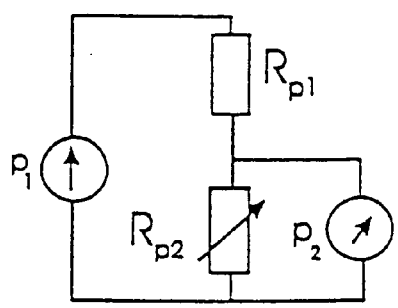
FIG. 4 illustrates the pressure dividing circuit to FIG. 3.

In FIG. 4 a simple, analog model of a length measurement pressure converter (see FIGS. 1 and 2) is shown. The voltage is replaced with the air pressure and the resistance with the corresponding pneumatic resistance $R_p=k/A^2$, with k being a constant. From this the following equation follows:

$$p_2 = \frac{p_1}{1 + \frac{R_{p1}}{R_{p2}}} = \frac{p_1}{1 + \frac{A_2^2}{A_1^2}} = \frac{p_1}{1 + B_x^2} \tag{4}$$

wherein $$B = \beta 16 \frac{D_2^2}{D_1^4}.$$

The factor $\beta$ is also dependent on the outflow figures $\alpha_1$ and $\alpha_2$ [2, 6]. In FIG. 4 plots of the equation (4) are shown simultaneously with a recorded characteristic ($D_1$=0.86 mm; $D_2$=1 mm; $\beta$=0.5; $p_1$=3.0 bar).

2.2 Network with Bridge

Figure 6:
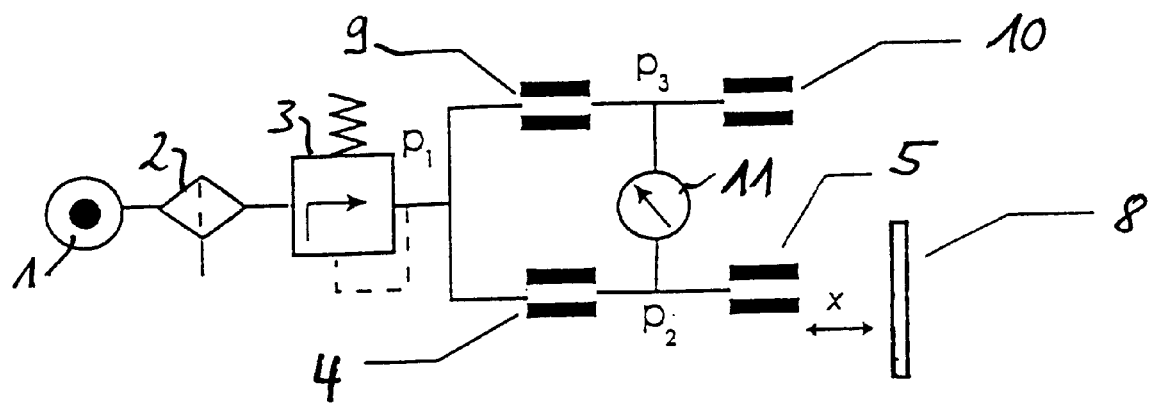
FIG. 6 illustrates the classical pressure measurement method with a pneumatic measurement bridge.

In the pressure difference measurement method, the difference $\delta$ of the measurement pressure $p_2$ relative to a comparison pressure $p_3$ is used for the formation of the measured value (see FIG. 6). Since the comparison pressure $p_3$ is directly related to the feed pressure $p_1$, the influence of the pressure fluctuations in the air supply is minimized.

If the reference pre-nozzle corresponds to the pre-measurement nozzle, and if the reference nozzle was so selected that its cross-section corresponds to the gap x at the point of inflection $X_0$ (see FIGS. 5 and 6), then the measurement value around the "zero-point" becomes independent from the air supply pressure $p_1$ (for example in the range 3.0 bar±0.3 bar). This is illustrated with respect to the equivalent circuit in FIG. 7. The pressure difference $\delta$ indicated is calculated in accordance with the equation (5):

$$\delta = p_3 - p_2 = p_1 \left( K_3 - \frac{1}{1 + Bx^2} \right) \tag{5}$$

The constant $K_3$ is determined by the cross-sections of the reference pre-nozzle and the reference nozzle. If the pressures $p_2$ and $p_3$ are the same, i.e. $K_3=1/(1+Bx^2)$, then the measured value is independent of $p_1$. The greater the difference $\delta$, the more the stability of the measurement value depends on the air supply pressure (see Table 4).

3. The Calibration in the Pressure Measuring Method

Figure 8:
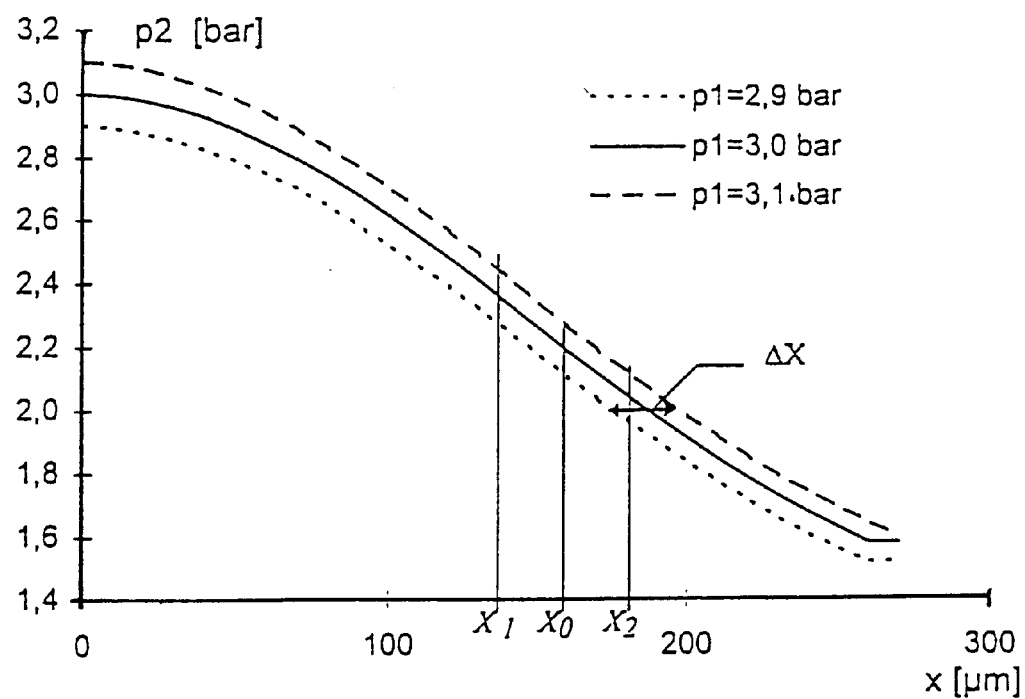
FIG. 8 illustrates the characteristics of the measurement branches of FIG. 2, which are strongly influenced by the air supply pressure.

In FIG. 8 the characteristics found for a pneumatic length measuring system (network without bridge; see FIGS. 2 and 3) are shown for different air supply pressures ($p_1$=2.9, $p_1$=3.0, and $p_1$=3.1 bar). The center of the linear measurement range (i.e. the point of inflection) wanders in this case around $X_0$=160 µm. Assuming that the pressure $p_1$ can be kept at a constant value (for example $p_1$=3.0 bar) and that the linear measurement range was selected for the measurement (for example in this case ±20 µm about the point of inflection $X_0$) then the equation (6) can be used for the calibration. $X_1$ and $X_2$ are two specific distances, which can be measured with a micrometer screw (e.g. $X_1=X_0-20$ µm=140 µm and $X_2=X_0+20$ µm =180 pm). The value $P_{x1}$ is the value of the measurement pressure $p_2$ at a distance $X_1$, and $P_{x2}$ is the value of $p_2$ at a distance of $X_2$.

$$x = X_1 + (p_2 - P_{x1})\frac{X_2 - X_1}{P_{x2} - P_{x1}} \qquad (6)$$

The bridge circuit can also be calibrated with the formula (6). The variable $p_2$ is now correspondingly replaced by the variable δ [8].

In practice, air pressure sensors are used, which deliver at the output a non-calibrated output signal with the linear dependency on the measured pressure (i.e. $u=kp_2+b$ (current or voltage)). The equation (6) also applies in this case; however, the unknowns $p_2$, $P_{x1}$ and $P_{x2}$ are substituted by the set u, $U_{x1}$ and $U_{x2}$.

4. Improved Embodiment of the Customary Air Pressure Measurement Method

It is evident from FIG. 8 that the pressure fluctuations $\Delta p_1$ above ±100 mbar cause a falsification of the spacing $\Delta x=25$ μm. That is to say, for a pressure fluctuation of ca. ±3.3% of the air supply, this corresponds to 30% to 50% of the measurement range. A shift of the point of inflection $X_0$ by 10 to 15 μm can be clearly recognized. The calibration formula (6) is only usable for the case of a stable and constant air pressure supply $p_1$ (as a rule a stability of the supply pressure of ≦1% is required).

Figure 9:
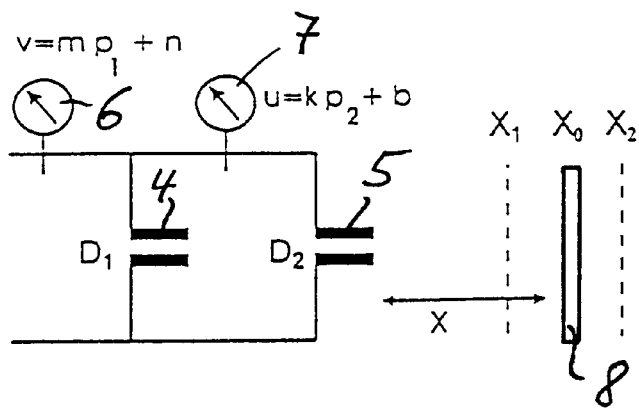
FIG. 9 illustrates the compensation of the measurement valve via an additional pressure sensor.

At this point a transformation of the crude measured value is achieved with the aid of an additional pressure measuring sensor (that is, the sensor with the output parameter v; see FIG. 9). Thus, the calibration formula (6) can continue to be used. As a consequence, the stability of a bridge circuit is achieved. For the pressure change of the air supply of above ±100 mbar, the measured value may only be permitted to change by ±0.5 μm within the entire measurement range.

The direct path of solution of the object set out above is to form the measurement pressure $p_2$ with a transformation of $p_2$ and the actual value of the air pressure supply $p_1$.

And thus the result can be inserted into the equation (6), i.e. $p_2 \rightarrow f(p_1, p_2)$. The compensation condition which must therefore satisfy the transformation is:

$$f(p_1, p_2) = \text{const. at } x = X_0 \qquad (7)$$

Thus a measured value can be formed in the middle of the measurement range independently of the air supply pressure.

TABLE 1

Changes of $p_1$ [bar] and $p_2$ [bar] at the distances $X_1$, $X_0$ and $X_2$ (reference to FIG. 4 and FIG. 8)

|  | $p_1$ | $p_2$ | $p_1 - p_2$ | $p_1$ | $p_2$ | $p_1 - p_2$ | $p_1$ | $p_2$ | $p_1 - p_2$ |
|---|---|---|---|---|---|---|---|---|---|
| $X_1$ | 2.901 | 2.245 | 0.656 | 3.001 | 2.329 | 0.672 | 3.102 | 2.413 | 0.688 |
| $X_0$ | 2.899 | 2.102 | 0.797 | 3.000 | 2.182 | 0.818 | 3.101 | 2.263 | 0.838 |
| $X_2$ | 2.902 | 1.966 | 0.935 | 3.000 | 2.041 | 0.959 | 3.101 | 2.118 | 0.984 |

In Table 1 the results found in FIG. 8 are shown. The intuitive nature of the compensation of the measurement pressure $p_2$ with the difference to $p_1$, i.e. the transformation:

$$f(p_1, p_2) = p_1 - p_2 \qquad (8)$$

does not appear to be plausible, because it does not behave constant in accordance with Table 1 at a fixed spacing x (e.g. at $x=X_0$ the pressure difference $p_1-p_2$ for $\Delta p_1=202$ mbar varies by $\Delta(p_1-p_2)=41$ mbar).

It can be derived from Table 1 that the pressure ratio $p_1$ to $p_2$ is not the same with reference to a rising reference pressure p. This is shown in the sketch in FIG. 10. A change of p with reference to $P_A$ to $P_B$ results at $p_1$ as a change from $P_{1A}$ to $P_{1B}$, i.e. at P2 as a change from $P_{2A}$ to $P_{2B}$.

The condition (7) and the transformation (8) can now be newly written in this system:

$$p_1(p) - p_2(p) = \text{const. at any desired p} \qquad (9)$$

Figure 10:
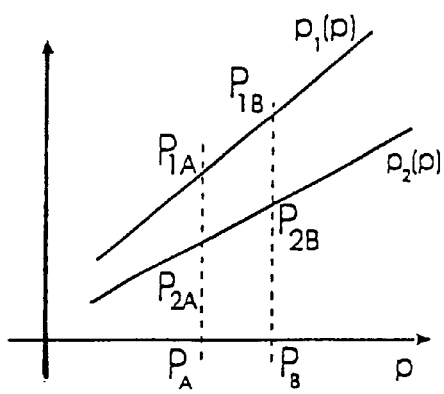
FIG. 10 illustrates the straight pressure lines $p_1$ and $p_2$ in relation to the reference pressure abscissa.

Since one can assume linear relationships, the pressure conditions of FIG. 10 can be further developed:

$$p_1(p) - p_2(p) = k_1 p + m_1 - k_2 p - m_2 = p(k_1 - k_2) + m_1 - m_2 = \text{const} \qquad (10)$$

with $k_1$ and $k_2$ describing the straight line coefficients and $m_1$ and $m_2$ the points of intersection on the Y axis at X p=0 for the straight lines $p_1(p)$ and $p_2(p)$. Since $m_1$ and $m_2$ are constant, the equation (10) is satisfied if $k_1=k_2$. Since, however, $k_1$ is a fixed constant, a correction value is necessary in order to be able to satisfy the required condition, i.e.:

$$k_1 \alpha = k_2 \qquad (11)$$

The coefficient α can simply be calculated:

$$\alpha = \frac{k_2}{k_1} = \frac{\dfrac{P_{2B} - P_{2A}}{P_B - P_A}}{\dfrac{P_{1B} - P_{1A}}{P_B - P_A}} = \frac{P_{2B} - P_{2A}}{P_{1B} - P_{1A}} \qquad (12)$$

Since, in accordance with (9), no precise value but only a constant value is demanded, the coefficients of (10) $m_1$ and $m_2$ are omitted, i.e. the transformation (11) satisfies the condition (9):

$$p_1(p) - p_2(p) = k_1 \alpha p - k_2 p \qquad (13)$$

Figure 11:
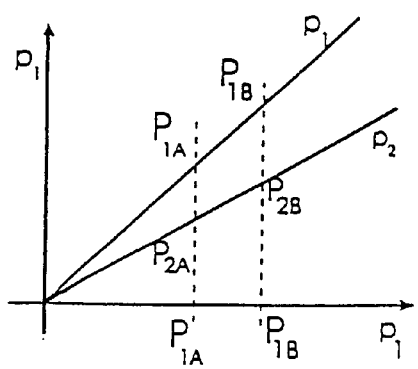
FIG. 11 illustrates the straight pressure lines $p_1$ and $p_2$ in relation to the air supply pressure $p_1$.

The reference pressure p can be selected as desired. If we set $p=p_1$, then the expressions (12) and (13) become more specific, as can be seen in FIG. 11, i.e. the required transformation reads:

$$f(p_1, p_2) = \alpha p_1 - p_2 \qquad (14)$$

The calibration formula (6) is now:

$$x = X_1 + (f(p_1, p_2) - F_1)\frac{X_2 - X_1}{F_2 - F_1} \qquad (15)$$

with $F_1$ being the value of the transformation $f(p_1, p_2)$ at the first ($X_1$) and $F_2$ being the value of the transformation $f(p_1, p_2)$ at the second adjustment master ($X_2$). Instead of the precise air pressure values $p_1$ and $p_2$, direct uncalibrated sensor outputs v and u can now be used in the equations (14) and (15): $f(v, u) = \alpha v - u$.

5. Example and Results

The calibration of the P/E transducer in accordance with the newly described embodiment takes place in two steps. In the first step the compensation coefficient α is determined.

TABLE 2

Determination of α

| $p_1$ [bar] | v [V] | u [V] |
|---|---|---|
| 2.8 | 6.988 | 5.061 |
| 3.2 | 7.983 | 5.853 |

This step is carried out only once. First, the impact plate is fixed at the "0"-position ($X_0$). For the nozzle combination $D_1=0.86$ mm and $D_2=1$ mm (see FIG. 9), $X_0=160\,\mu m$. Then the air pressure supply is set to ca. 2.8 bar, and the output values of the sensors (v and u) are taken on (see FIG. 9). The second value pair (v, u) is recorded at an increased pressure of ca. 3.2 bar. The constant a is calculated via the stored values in Table 2:

$$\alpha = \frac{7.983 - 6.988}{5.853 - 5.061} = 0.79598.$$

In the second step, the v and u values are adopted in the fixed positions $X_1=X_0-20\,\mu m$ and $X_2=X_0+20\,\mu m$, with the air pressure now being set in the pressure air supply at ca. 3.0 bar. In this way Table 3 can be produced:

TABLE 3

Crude values at $p_1$ ca. 3.0 bar

|  | v [V] | u [V] | f (v, u) |
|---|---|---|---|
| $X_1$ | 7.487 | 5.821 | 0.13850151 |
| $X_2$ | 7.486 | 5.103 | 0.85570553 |

From this table $F_1=0.13850151$ and $F_2=0.85570553$ are calculated. The measurement formula (15) reads, after insertion of the calculated constants:

$$x(v, u) = v \cdot 44.3934991 - u \cdot 55.7721358 + 132.28 \;[\mu m] \quad (16)$$

Figure 5:
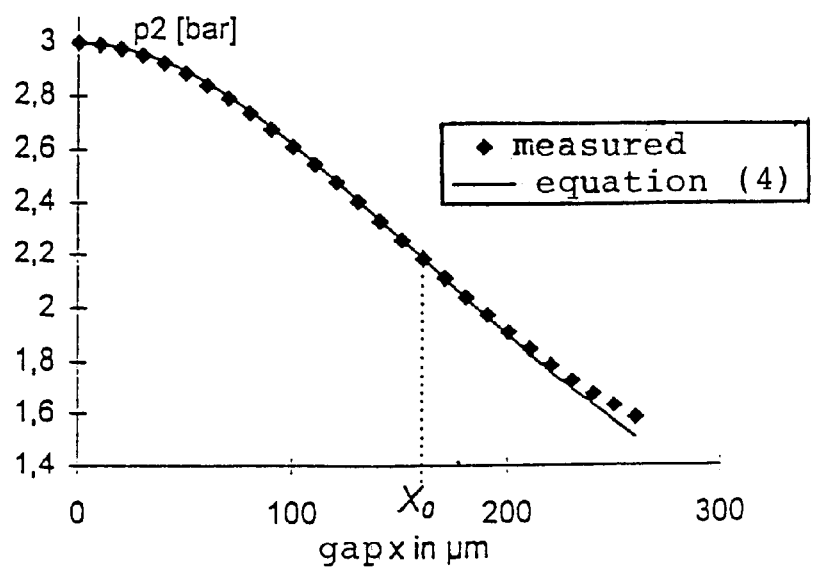
FIG. 5 illustrates the dependence of the measured pressure p2 on the gap x, wherein the quasi-linear measurement range around the point of inflection X0 is utilized.

In Table 4 the newly described pressure measuring method is compared with the classical variant (embodiment with bridge) (see FIG. 5). The data found, which were determined via the derived transformation (14) and the measurement formula (15), correspond.

6. Summary

The described new embodiment of the pressure measuring method has a synergy between the stability of a bridge circuit and the economy of air consumption of a classical pressure measurement method in accordance with DIN 2271. The main features are: lower mechanical effort in manufacturing the transducer, halved air consumption during the measurement operation, stable measurement signal, zero point shift without a mechanical change (i.e. range of insensitivity to the air supply pressure is determined by α).

7. Literature

[1] DIN 2271 part 1, part 2, part 3 and part 4

[2] Eler, R.: "Über den Stand der pneumatischen Feinmeβtechnik und zu Fragen des erforderlichen Gerätesortiments", (Concerning the state of pneumatic fine measurement technology and questions of the required assortment of instruments), Feingerätetechnik 12/1961, pages 563 to 571

[3] Falkenberg, Y., Werner F.: "Hochleistungsschleifscheiben prozeβnah messen", (Process orientated measurement of high performance grinding discs), Feinwerktechnik & Meβtechnik 102 (1994), 5–6, pages 256 to 262

[4] Gale, G. E.: "A thickness measuring device using pneumatic gauging to detect the sample", Meas. Sci. Technol. 6/1995, pages 1566 to 1571

[5] Lehnert, E.: "Pneumatische In-Process-Meβtechnik", Qualitätstechnik, (Pneumatic in-process measurement technology, Quality Technology), QZ 12/1987, pages 583 to 586

[6] Lotze, W.: "Neue Methoden zur Berechnung pneumatischer Feinzeiger", (New method for calculating pneumatic fine indication apparatus), Feingerätetechnik 6/1966, pages 275 to 281

[7] Lotze/Kondaschewski: "Meβsteuergerate spanender Werkzeugmaschinen", (Measurement control instruments of chip forming machine tools), Berlin, VEB Verlag Technik (1974)

[8] Stamenkovic, M.: "Genaues Kalibrieren und Messen ohne genaue Positionierung des Werkstückes", (Precise calibration and measurement without accurate positioning of the workpiece), Feinwerktechnik & Meβtechnik 9/1996, pages 651 to 654

[9] Wiemer, A.: "Pneumatische Längenmessung", (Pneumatic length measurement), VEB Verlag 1970
Section: Compensation of the Supply Pressure Over the Whole Measurement Range

TABLE 4

Determined and desired measured values for the different air supply pressures

| | A: classic method | | | B: new method | | |
|---|---|---|---|---|---|---|
| $p_1$ [bar] | desired: $X_1$ [$\mu m$] | desired: $X_0$ [$\mu m$] | desired: $X_2$ [$\mu m$] | desired: $X_1$ [$\mu m$] | desired: $X_0$ [$\mu m$] | desired: $X_2$ [$\mu m$] |
| 2.7 | 141.8 | 160.5 | 178.6 | 141.7 | 160.4 | 178.5 |
| 2.8 | 141.2 | 160.4 | 178.9 | 141.1 | 160.2 | 179.0 |
| 2.9 | 140.6 | 160.3 | 179.5 | 140.6 | 160.3 | 179.6 |
| 3 | 140 | 160.3 | 180 | 140 | 160.3 | 180 |
| 3.1 | 139.4 | 160.3 | 180.5 | 139.4 | 160.3 | 180.5 |
| 3.2 | 138.7 | 160.2 | 181 | 138.7 | 160.2 | 180.9 |
| 3.3 | 138.1 | 160.1 | 181.5 | 138.2 | 160.2 | 181.4 |

A: classic bridge circuit
B: proposed embodiment of the pressure measuring method without bridge shows the same results

Variant 1: Compensation Related to the Pressures $p_1$ and $p_2$

Figure 7:
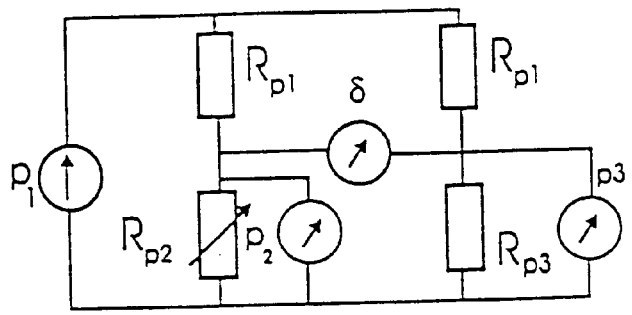
FIG. 7 illustrates an equivalent circuit to show that the network bridge circuit is independent of the air supply pressure p1.

The numerical data of Table 4 are shown graphically in FIG. 7. The measurement values (which were found in accordance with the formula 14) around the point $X_0=160$ mm are practically independent of the air supply pressure (Y axis in FIG. 12). For the larger deviations of $X_0$ (e.g. for more than $\pm 2$–$3\,\mu$m) the indication errors for the extreme air pressure fluctuations ($\pm 0.3$ bar about $P_0=3.0$ bar) are no longer negligible. In the illustrated example the read of the indicated measured values for $X_1$ and $X_2$ lies at ca. $3\,\mu$m (see Table 4 and FIGS. 12 and 13).

Figure 13:
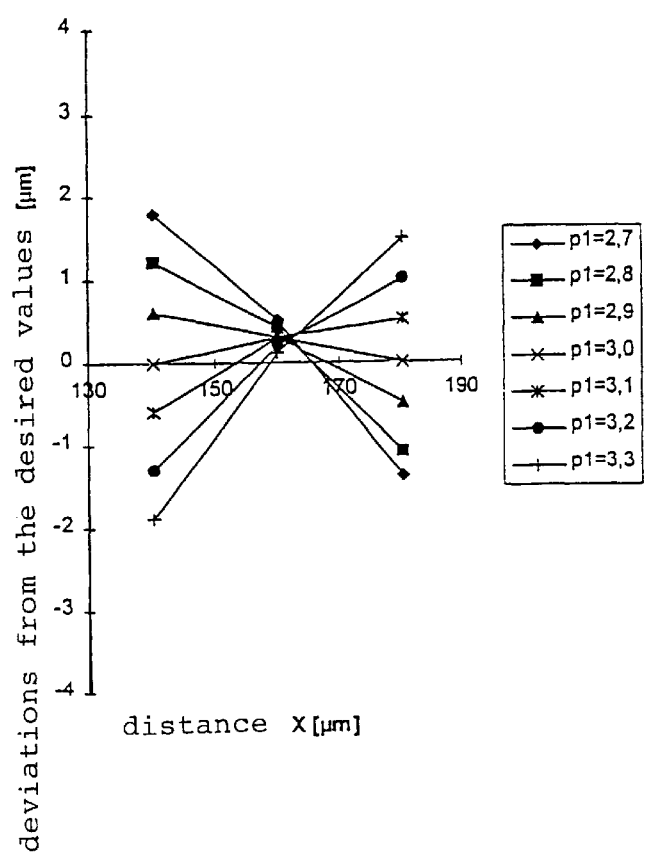
FIG. 13 illustrates the indication error, which increases with the increase in distance to the distance $x = X_0$.
Figure 14:
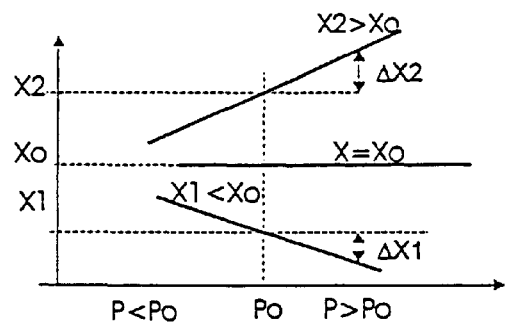
FIG. 14 illustrates the indicated distance in dependence on the air pressure.
Figure 15:
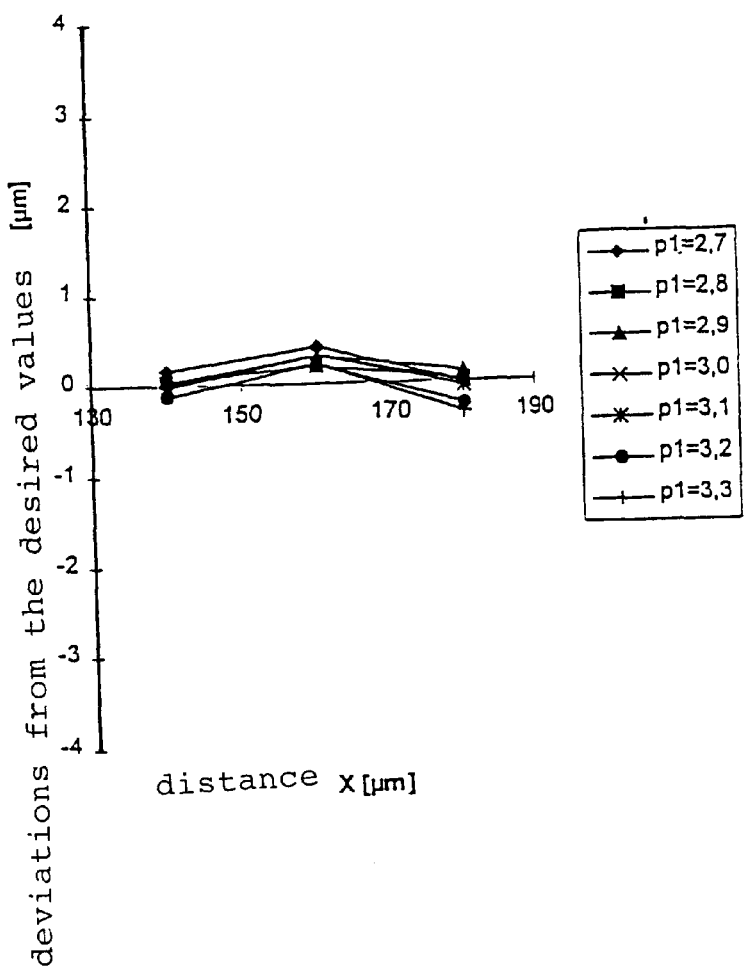
FIG. 15 illustrates the deviations from the desired value, with an increase of the stability of the measured value of up to ten times being obtained by use of the equation 22.

In accordance with these data a general behavior of the pneumatic bridge is presented in FIG. 13. For the pressure $p_1 > P_0 = 3.0$ bar and for $x > X_0$ (e.g. $x = X_2$) a falsified enlargement of the indication would result (see FIG. 13). For the same distance ($x > X_0$) a reduction of $p_1$ ($p_1 < P_0$) causes a production of the indication of the measured distance. If, however, x is smaller than $X_0$ (e.g. if $x = X_1$), the sign of the falsification will invert.

In general form, the value y, which is read off, can be considered as the sum of the true value $x_e$ at air pressure $p_1 = P_0$ and of the generated error $\epsilon$, i.e.:

$$x = x_e + \epsilon \tag{17}$$

Figure 12:
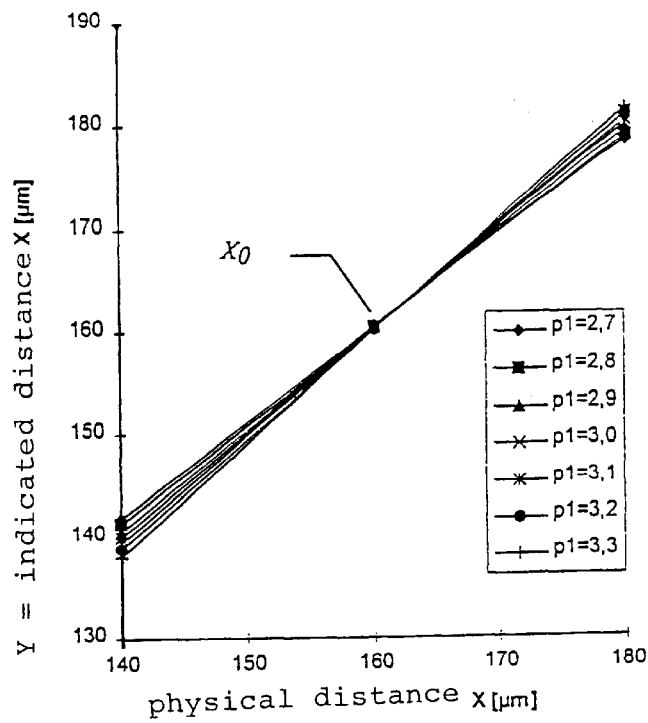
FIG. 12 illustrates a representation of the data of Table 4, in accordance with which the measured distance $x = X_0$ is independent of the air supply pressure $p_1$.

As can be seen from FIGS. 12 and 13, it can be assumed that the error $\epsilon$ directly follows the deviation $\Delta x = x - X_0$ and the pressure difference $\Delta p = p_1\, P_0$, i.e.:

$$\epsilon = \gamma \Delta p\ \Delta x = \gamma(p_1 - P_0)(x - X_0) \tag{18}$$

where $\gamma$ is a constant of the proportionality. It is assumed that at the pressure $p_1 = P_0$ the error $\epsilon$ is equal to zero ($\epsilon = 0$), i.e. that in this case $x = x_e$ over the full measurement range. Thus, the equation for the corrected measured value results:

$$x_e = x - \gamma \Delta p \Delta x \tag{19}$$

The constant $\gamma$ is derived in relation to a specific pressure $P_0$ and to a specific mean value $X_0$:

$$\gamma = \frac{X_{2Ph} - X_{2Po}}{(P_h - P_0)(X_{2Ph} - X_{0Po})} \tag{20}$$

wherein $X_{2Ph}$ is the indicated measured value at the pressure $p_1 = P_h$ and $x = X_2$; $X_{2Po}$ is the indicated measured value at the pressure $p_1 = P_0$ and $x = X_2$; $X_{0Po}$ is the indicated measured value at the point $x = X_0$ measured at the pressure $p_1 = P_0$. For the calculation of the equations (19) and (20) already 10 calibrated values are necessary, or the distance value $y = x$ must first be formed in accordance with equation (15) and then $\Delta x$ calculated. In the same way, the calibrated pressure $p_1$ is required for the calculation of $\Delta p$.

The developed expression (19) now reads:

$$x_e = x(1 + \gamma P_0 - \gamma p_1) + X_0 \gamma p_1 - P_0 X_0 \gamma \tag{21}$$

with the value x being found in accordance with the equation (15). The equation (21) can be used for the compensation of the classic network circuit with the pneumatic bridge. In the summarized form of (15) and (21) $x_e$ is calculated in the following manner:

$$x_e\left(X_1 + (\alpha p_1 - p_2 - F_1)\frac{X_2 - X_1}{F_2 - F_1}\right)(1 + \gamma P_0 - \gamma p_1) + X_0 \gamma p_1 - P_0 X_0 \gamma \tag{22}$$

As an example, the values are taken over from the Table 4 (these data are shown graphically in FIG. 12), with the constant $\gamma$ being:

$$\gamma = \left(\frac{178.5 - 180}{(2.7 - 3)(178.5 - 160.3)}\right) = 0.2747.$$

Since the already calibrated x values are available in the Table 4, the following expression is achieved after inserting the values of the Table 5 into the equation (15):

$$x_e = x(1 + \gamma P_0 - \gamma p_1) + X_0 \gamma p_1 - P_0 X_0 \gamma = x(1.82423 - 0.2747 p_1) + 44.038 p_1 - 132.1 \tag{23}$$

TABLE 5

Inserted values for the compensation of $p_1$

| | | |
|---|---|---|
| $X_1 = 140\,\mu$m | $X_{2P0} = 180\,\mu$m | $P_0 = 3$ bar |
| $X_0 = 160\,\mu$m | $X_{2Ph} = 178.5\,\mu$m | $P_h = 2, 7$ bar |
| $X_2 = 180\,\mu$m | $X_{0P0} = 160.3\,\mu$m | |

The value x is fed into (23) in $\mu$m and the pressure $p_1$ is fed into (23) in bar. The numerical data from the Table 4 (column B) were treated in accordance with (21) and shown as results in Table 6.

In the example the nozzle combination $D_1 = 0{,}86$ mm and $D_2 = 1$ mm was taken (see FIG. 9). With this nozzle set a measurement range $\pm 50\,\mu$m is measured in practice. The transducer was calibrated at the points $X_1 = 140\,\mu$m and $X_2 = 180\,\mu$m. Because of the linearity error, $X_0 = 160\,\mu$m is indicated falsified by $0.3\,\mu$m. This error does not influence the stability calculation. Accordingly, in Table 6 the compensation relates to the desired value $X_0 = 160{,}3\,\mu$m.

TABLE 6

Found values and desired measured values for the different air supply pressures

| | A: difference from desired values | | | B: measured values $x_e$ | | |
|---|---|---|---|---|---|---|
| $p_1$ [bar] | desired: 0 [$\mu$m] | desired: 0 [$\mu$m] | desired: 0 [$\mu$m] | desired: $X_1$ [$\mu$m] | desired: $X_0^1$ [$\mu$m] | desired: $X_2$ [$\mu$m] |
| 2.7 | 0.17 | 0.11 | 0.00 | 140.17 | 160.41 | 180.00 |
| 2.8 | 0.04 | −0.11 | 0.03 | 140.04 | 160.19 | 180.03 |
| 2.9 | 0.06 | 0.0 | 0.13 | 140.16 | 160.30 | 180.13 |
| 3 | −0.11 | 0.0 | 0.00 | 140.00 | 160.30 | 180.00 |
| 3.1 | 0.03 | 0.0 | −0.05 | 139.97 | 160.30 | 179.95 |
| 3.2 | −0.11 | −0.11 | −0.23 | 139.89 | 160.21 | 179.77 |
| 3.3 | 0.02 | −0.11 | −0.34 | 140.02 | 160.21 | 179.66 |

TABLE 6-continued

Found values and desired measured values for the different air supply pressures

| | A: difference from desired values | | | B: measured values $x_e$ | | |
|---|---|---|---|---|---|---|
| $p_1$ [bar] | desired: 0 [μm] | desired: 0 [μm] | desired: 0 [μm] | desired: $X_1$ [μm] | desired: $X_0^1$ [μm] | desired: $X_2$ [μm] |

A: difference from the desired values x (at $p_1 = P_0$)
B: values found in accordance with the equation (23)

The calculated measured values xe have almost no changes for the customary air pressure fluctuations (above ±0,1 bar), i.e. the changes of $x_e$ that are found lie under ±0,1 μm (see Table 6).

The ±0,1 bar-band is also almost preserved for air pressure fluctuations of 2,8 bar to 3,2 bar, which in practice are exaggerated.

In comparison to a classic pneumatic pressure difference measurement method with a bridge circuit (or in comparison to the improved pressure measuring methods described in Sections 4 and 5), the compensation equation (22) shows an increase of the stability of the measured value by up to ten times. If the value x differs greatly from the $X_0$, the relative gain in stability is even greater.

Variant 2: Compensation Related to the Pressure Sensor Values v and u:

For the calculation of $x_e$ in accordance with the formula (22) two calibrated pressure sensors are required for the precise measurement of $p_1$ and $p_2$. If a classic PEW-transducer with a bridge circuit is to be compensated in this way, only one sensor is required in accordance with the equation (21). In this case the air consumption, however, doubles. Since these requirements make the use of the described compensation more expensive, a form of the equation (22) independent of $p_1$ and $p_2$ is desired. In this chapter the derivation of such a compensation formula will be explained.

As illustrated in FIG. 9, the pressure sensors deliver uncalibrated voltages v and u. The voltage v has a linear dependency on the pressure $p_1$ and the voltage u has a linear dependency on the pressure $p_2$, i.e. the following can be written:

$$v = mp_1 + n; \quad u = kp_2 + b \qquad (24)$$

where m, n k and b are constants. These constants are determined by the electronic amplifiers and characteristics of the pressure sensors. As was described in chapters 4 and 5, the transformation (14) can be calculated directly with these voltage values, i.e.:

$$f(v, u) = \alpha v - u \qquad (25)$$

The coefficient a is calculated at the distance $x = X_0$ as was described in chapter 5:

$$\alpha = \frac{u_h - u_l}{v_h - v_l} \qquad (26)$$

wherein the indices h and l designate the overpressure and the underpressure. For example, $v_h$ and $u_h$ are output voltages at the supply pressure $p_1 = P_h$; in the same way $v_1$ and $u_1$ are output voltages at the supply pressure $p_1 = P_1$. The pressures $P_h$ And $P_1$ do not need to be accurately determined. They should, however, be located around the target pressure $p_1 = P_0$ (e.g. $P_h = 2,8$ bar and $P_1 = 3,2$ bar or vice versa).

Figure 16:
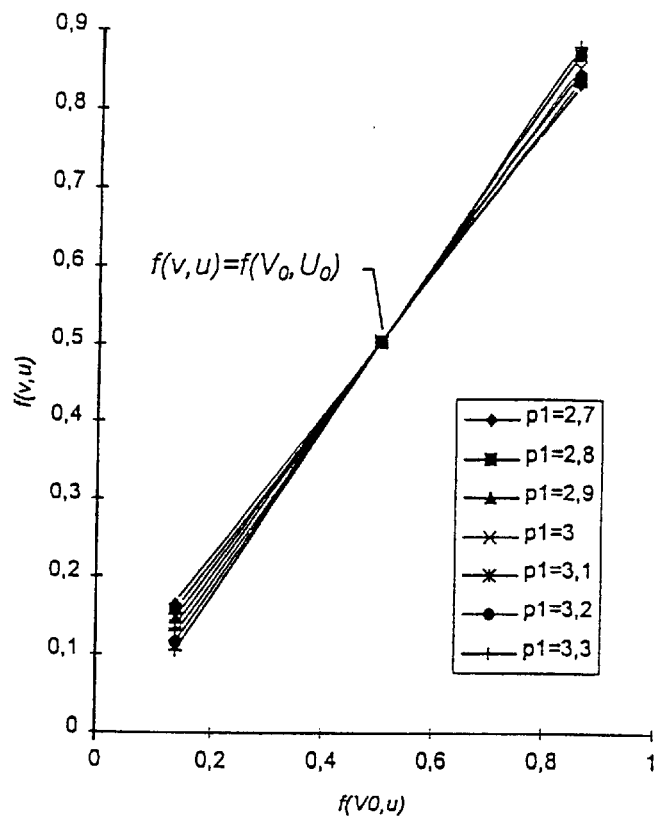
FIG. 16 illustrates the transformation f(v, u), the crude value of which is independent of the air supply pressure only around the point $x = X_0$.
Figure 17:
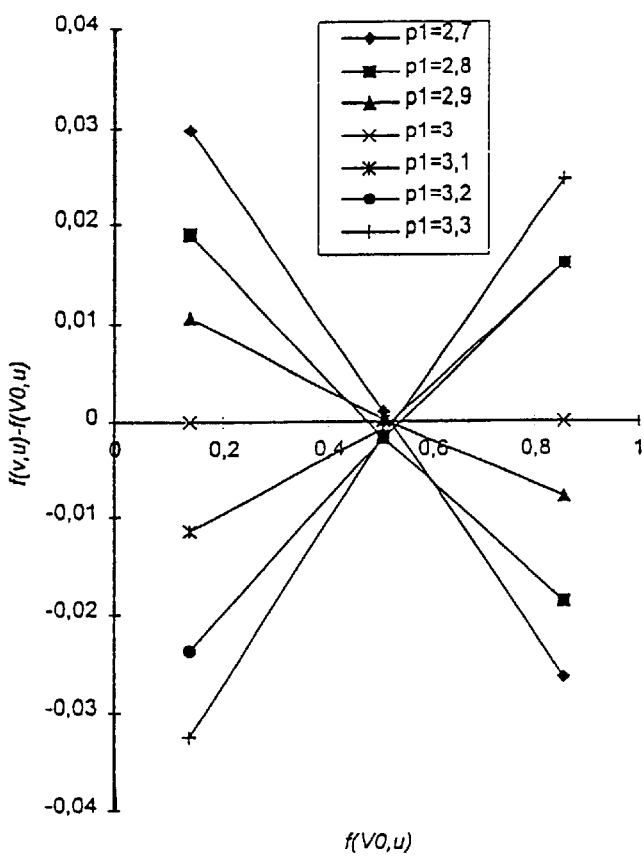
FIG. 17 illustrates the differences $f(v, u) - f(V_0, u)$ which lead to the deviations of the air supply pressure $p_1$ to the reference pressure $p_1 = P_0$ and which are proportional to the distance from the reference point $x = X_0$.

The expression (25) has an independence of v (i.e. independence from $p_1$) only at a fixed point $x = X_0$; i.e. in association with the formula (14) the measured value behaves as in a classic pneumatic bridge. This is illustrated in FIG. 16. The values of f(v, u) at a constant value $v = V_0$, i.e. the values of $f(V_0, u)$, are shown on the horizontal axis. This state corresponds to $p_1 = P_0$. It can be seen from FIG. 16 that all parametricized straight lines f(v, u) intersect at one point. This point is $f(V_0, U_0)$, i.e. the value of f(v, u) determined at the distance $x = X_0$ and at the supply pressure $p_1 = P_0$. In FIG. 17 the difference between f(f, u) and $f(V_0, u)$ is shown on the vertical axis.

The differences $f(v, u) - f(V_0, u)$ are proportional to the deviations of the supply pressure $p_1$ relative to the reference pressure $p_1 = P_0$ and to the distance to the reference point $x = X_0$.

The expression (25) with which f(v, u) is defined should now be so converted that the result of f(v, u) remains constant at a desired point $x = X_i$, even with different values of $p_1$. For this purpose a correction of f(v, u) is required. Since v and u are linear functions of $p_1$ and $p_2$ these corrections will have the form of equations (17, 18) and (19):

$$f(v, u) = f_e(v, u) + \omega \qquad (27)$$

$$\omega = \gamma \Delta v \Delta f(v, u) = \gamma(v - V_0)(v\alpha - u - F_0) = \gamma(v - V_0)(v\alpha - u - V_0\alpha + U_0) \qquad (28)$$

where $F_0 = V_0\alpha - U_0$ is the value of the transformation of f(v, u) at the point $x = X_0$ at the reference pressure $p_1 = P_0$. The reference pressure $P_0$ corresponds to the output voltage $V_0$. Under the same conditions the value $U_0$ is the voltage magnitude from the pressure measurement sensor.

The corrected transformation (25) now reads:

$$f_e(v, u) = f(v, u) - \gamma \Delta v \Delta f(v, u) = v\alpha - u - \gamma(v - V_0)(v\alpha - u - V_0\alpha + U_0) \qquad (29)$$

The constant γ is calculated in accordance with the following equation:

$$\gamma = \frac{F_{2V_h} - F_{2V_0}}{(V_h - V_0)(F_{2V_h} - F_{0V_0})} \qquad (30)$$

wherein: $F_{2V_h}$ is the value of f(v, u) at $v = V_h$ and $x = X_2$; $F_{2V_0}$ is the value of f(v, u) at $v = V_0$ and $x = X_2$; $F_{0V_0}$ is the value of f(v, u) at $v = V_0 = x = X_0$.

Figure 18:
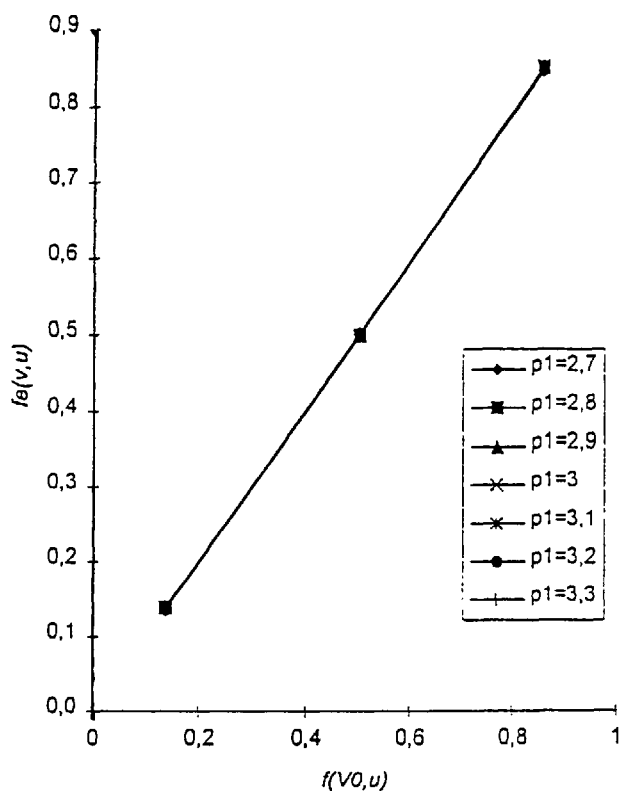
FIG. 18 illustrates the transformation for example(v, u)
Figure 19:
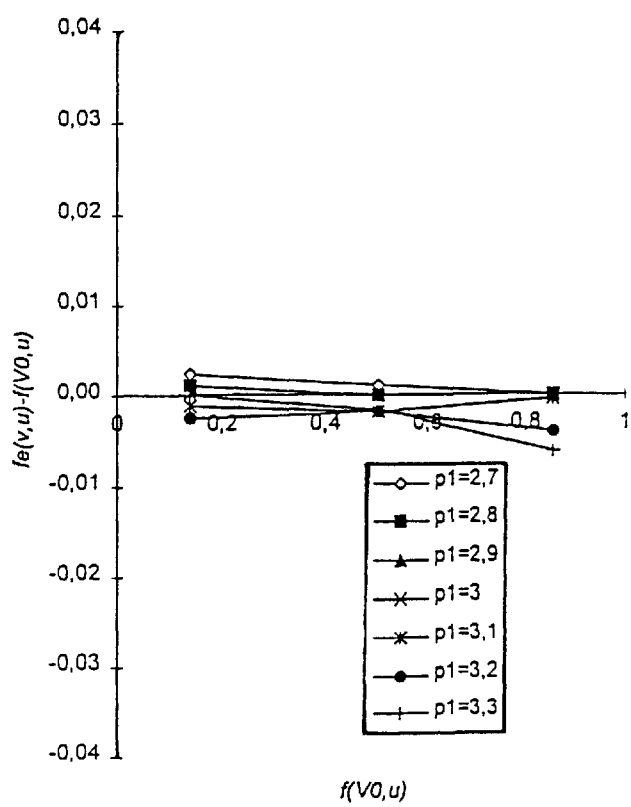
FIG. 19 illustrates the differences for example(v, u)−f($V_0$, u), in accordance with which the sensitivity achieved against air pressure fluctuations of $p_1$ is reduced by the factor 10.

In FIGS. 18 and 19 results of (28) are entered on the vertical axis (the numerical data are shown in Table 9). The horizontal axis is the same as in FIGS. 16 and 17. A brief comparison of FIGS. 16 and 17 with 19 documents a significant (ca. 10 times) reduction of the differences between the actual values $f_e(v, u)$ and the reference values $f(V_0, u)$.

Since the expression (29) provides a crude value independent of v (i.e. of $p_1$), it can be directly substituted in the calibration formula (15):

$$x_e = X_1 + (f_e(v, u) - F_1)\frac{X_2 - X_1}{F_2 - F_1} \quad (31)$$

with $F_1=f_e(v, u)$ at the distance $x=X_1$ and $F_2=f_e(v, u)$ at the distance $x=X_2$.

This results in the calibration equation (32), which does not require any calibrated air pressure values as argument, but rather only uses the pressure sensor output values v and u, i.e.:

$$x_e = X_1 + (v\alpha - u - \gamma(v - V_0)(v\alpha - u - V_0\alpha - U_0) - F_1)\frac{X_2 - X_1}{F_2 - F_1} \quad (32)$$

The required parameters ($\alpha$, $\gamma$, $V_0$, etc.) can be calculated from 6 or 5 calibration steps. If one sets $X_1=X_0$ for the original calibration, then the step 6 is superfluous. This is in particular necessary if an analogue circuit solution of the equation (xx) is to occur. In order to be able to show a more accurate comparison between the compensation method and improved pressure measurement methods, $X_1$ is considered separately from $X_0$ in the described example, i.e. the step 6 is used. The required steps are shown in the Table 7 (in this Table the data of Table 2 are used). In this way the same $\alpha$ value is used and a direct comparison of the results is made easier.

TABLE 7

Carrying out the original calibration in 6 or 5 steps

| Step | Sensor value v [V] | Sensor value u [V] | Supply pressure [bar] | Distance x [μm] | Remarks |
|---|---|---|---|---|---|
| 1 | $V_1$ = 6.988 | $U_1$ = 5.061 | 2.8 | x = $X_0$ | calculation of $\alpha$ |
| 2 | $V_2$ = 7.983 | $U_2$ = 5.853 | 3.2 | x = $X_0$ | calculation of $\alpha$ |
| 3 | $V_3$ = 7.484 | $U_3$ = 5.454 | 3.0 (exact!) | x = $X_0$ | |
| 4 | $V_4$ = 7.486 | $U_4$ = 5.103 | 3.0 (exact!) | x = $X_2$ | |
| 5 | $V_5$ = 6.738 | $U_5$ = 4.534 | 2.7 | x = $X_2$ | |
| 6 | $V_6$ = 7.487 | $U_6$ = 5.821 | 3 | x = $X_1$ | Omitted if $X_1$ = $X_0$ |

Step 1: The impact plate is brought to a distance x = $X_0$ = 160 μm from the nozzle $D_2$ (see FIG. 9). The air supply pressure is set to ca. 2.8 bar. This values does not need to be accurately set. It is, however, important that the value is 0.1 to 0.3 bar smaller or greater than "zero"-pressure $P_0$ = 3.0 bar. The actual sensor voltage values v = $V_1$ and u = $U_1$ are stored.
Step 2: With the distance x = $X_0$ unchanged, the supply pressure is set in the opposition direction from the pressure set in step 1. In this case the value of ca. 3.2 was selected. The values $V_2$ and $U_2$ correspond to this state.
Step 3: With the distance x = $X_0$ unchanged, the supply pressure is accurately set to 3.0 bar. In this step the reference state is reached (x = $X_0$; pressure = $P_0$), i.e. the values $V_0$ and $U_0$ are recorded.
Step 4: With an unchanged "zero"-pressure $P_0$ = 3.0 bar, the impact plate is brought to a distance x = $X_2$ = 180 μm. The supply pressure should be precisely set up as long as the value $V_4$ corresponds with the value $V_3$ = $V_0$.
Step 5: With the distance x = $X_2$ unchanged, the supply pressure is set to ca. 2.7 bar. Instead of 2.7 bar a larger pressure than $P_0$ = 3.0 bar can also be selected, for example 3.2 bar.
Step 6: With the distance x = $X_1$ unchanged, the supply pressure is set to ca. 3 bar (this step is superfluous if $X_1$ = $X_0$).

If the calibration steps have been carried out, then the required parameters are calculated in accordance with the expressions and sequences which are shown in the Table 8:

TABLE 8

| No. | Expression |
|---|---|
| 1 | $\alpha = \dfrac{U_2 - U_1}{V_2 - V_1} = \dfrac{5.853 - 5.061}{7.983 - 6.988} = 0.7959799$ |

TABLE 8-continued

| No. | Expression |
|---|---|
| 2 | $V_h = V_5 = 6.738$ |
| 3 | $V_o = V_3 = V_4 = 6.738$ |
| 4 | $U_o = U_3 = 5.454$ |
| 5 | $F_{2V_h} = V_5\alpha - U_5 = 0.92931257$ |
| 6 | $F_{2V_0} = V_4\alpha - U_4 = 0.85570553^2$ |
| 7 | $F_{0V_0} = V_3\alpha - U_3 = 0.50311357$ |
| 8 | $\gamma = \dfrac{F_{2V_h} - F_{2V_0}}{(V_h - V_0)(F_{2V_h} - F_{0V_0})} = 0.10845929$ |
| 9 | $F_1 - V_6\alpha - U_6 - \gamma(V_6 - V_3)(V_6\alpha - U_6 - F_{0V_0}) = 0.13862015$ |
| 10 | $F_2 - V_4\alpha - U_4 - \gamma(V_4 - V_3)(V_4\alpha - U_4 - F_{0V_0}) = 0.85562905$ |
| 11 | $\dfrac{X_2 - X_1}{F_2 - F_1} = 55.7873131$ |

The parameters of the equation (20) are found from the data of Table 8

In reality, the difference between V3 and V4 will already result. This is also the case in the illustrated example, where V3=7,484 [V] and V4=7.486 [mV]. This difference of ca. 2 mV can be ignored because the sensitivity of the sensors used lies at ca. 2.5 V/bar.

After the insertion of the calculated constants in the formula (12) a specific calibration formula can be written:

$$x_3 = 140 + 55{,}78731 \, (f_3(v, u) - 0{,}13862) \quad (33)$$

wherein the function $f_3(v, u)$ is:

$$f_3(v, u) = v0{,}79598 - u - 0{,}108459(v - 7{,}484)(v0{,}79598 - u - 0{,}50311) \quad (34)$$

The uncompensated transformation f(v, u) is simpler:

$$f(v, u) = v0{,}79598 - u \quad (35)$$

TABLE 9

Measured pressure sensor values for the distances $X_1$, $X_0$ and $X_2$ with air supply pressure fluctuations from 2.7 to 3 bar.

| | $x = X_1 = 140\ \mu m$ | | | | $x = X_0 = 160\ \mu m$ | | | | $x = X_2 = 180\ \mu m$ | | | |
|---|---|---|---|---|---|---|---|---|---|---|---|---|
| $p_1$ | v | u | f (v, u) | $f_e$ (v, u) | v | u | f (v, u) | $f_e$ (v, u) | v | u | f (v, u) | $f_e$ (v, u) |
| 2.7 | 6.739 | 5.196 | 0.16811 | 0.14104 | 6.739 | 4.86  | 0.50411 | 0.50419 | 6.38  | 4.534 | 0.82931 | 0.85571 |
| 2.8 | 6.987 | 5.404 | 0.15751 | 0.13888 | 6.988 | 5.061 | 0.50131 | 0.50121 | 6.985 | 4.723 | 0.83692 | 0.85499 |
| 2.9 | 7.239 | 5.613 | 0.14910 | 0.13969 | 7.234 | 5.255 | 0.50312 | 0.50312 | 7.24  | 4.915 | 0.84789 | 0.85702 |
| 3   | 7.487 | 5.821 | 0.13850 | 0.13862 | 7.484 | 5.454 | 0.50311 | 0.50311 | 7.486 | 5.103 | 0.85571 | 0.85563 |
| 3.1 | 7.739 | 6.033 | 0.12709 | 0.13749 | 7.738 | 5.657 | 0.50229 | 0.50232 | 7.738 | 5.294 | 0.86529 | 0.85531 |
| 3.2 | 7.985 | 6.241 | 0.11490 | 0.13599 | 7.983 | 5.853 | 0.50131 | 0.50141 | 7.986 | 5.485 | 0.87170 | 0.85163 |
| 3.3 | 8.234 | 6.448 | 0.10610 | 0.13839 | 8.237 | 6.055 | 0.50149 | 0.50162 | 8.238 | 5.677 | 0.88028 | 0.84944 |

In Table 9 the crude sensor values v and u are shown together with the calculated transformations f(v, u) (in accordance with 35) and $f_3$(v, u) (in accordance with 34).

Around the point $x=X_0$ practically no differences between f(v, u) and $f_3$(v, u) can be noted for pressure fluctuations of $p_1=2.7$ to $p_1=3.3$ bar. The differences are first evident when the distance x deviates from the center point $X_0$ (e.g. $x=X_1$ or $x=X_2$). In this case the changes of f(v, u) are significant, with $f_e$(v, u) still remaining constant (see Table 8).

The relatively complicated equation (30) can be written in the following general form after calculation of the constants:

$$x_e = Av^2 + Bvu + Cv + Du + E \quad (36)$$

with the constants A, B, C, D and E being:

$$A = \frac{X_1 - X_2}{F_2 - F_1}\gamma\alpha \quad (37)$$

$$B = \frac{X_2 - X_1}{F_2 - F_1}\gamma \quad (38)$$

$$C = \frac{X_2 - X_1}{F_2 - F_1}(\alpha + \gamma(2V_0\alpha - U0)) \quad (39)$$

$$D = \frac{X_1 - X_2}{F_2 - F_1}(1 + \gamma V_0) \quad (40)$$

$$E = \frac{X_2 - X_1}{F_2 - F_1}(V_0\gamma(U_0 - V_0\alpha) - F_1) + X_1 \quad (41)$$

Thus, the values A=−4.8162, B=6,05065, C=83.494167, D=−01.07039 and E=109.484 result, i.e. the calibration equation:

$$x_e = -4.8162v^2 + 6.05065vu + 83.49417v - 101.07039u + 109.484 \quad (42)$$

The Table 10 represents the calibrated values which were calculated in accordance with the expression (42).

TABLE 10

Derived values and desired measurement values for the different air supply pressures

| | A: difference to the desired values | | | B: measured values | | |
|---|---|---|---|---|---|---|
| $p_1$ [bar] | desired: 0 [$\mu$m] | desired: 0 [$\mu$m] | desired: 0 [$\mu$m] | desired: $X_1$ [$\mu$m] | desired: $X_0$ [$\mu$m] | desired: $X_2$ [$\mu$m] |
| 2.7 | 0.13  | 0.09  | 0.00  | 140.13 | 160.39 | 180.00 |
| 2.8 | 0.01  | −0.07 | −0.04 | 140.01 | 160.23 | 179.96 |
| 2.9 | 0.06  | 0.03  | 0.08  | 140.06 | 160.33 | 180.08 |
| 3   | 0.00  | 0.03  | 0.00  | 140.00 | 160.33 | 180.00 |
| 3.1 | −0.06 | −0.01 | −0.02 | 139.94 | 160.29 | 179.98 |
| 3.2 | −0.15 | −0.06 | −0.22 | 139.85 | 160.24 | 179.78 |
| 3.3 | −0.01 | −0.05 | −0.35 | 139.99 | 160.25 | 179.65 |

A: difference from the desired values x
B: derived values in accordance with the equation (24)

The result i agrees with the results of Table 8.

Summary

Manuscript:

1. New pressure measuring method, which has the stability of the pressure difference measurement method.

Section:

1. Supply pressure compensation of the classic pneumatic bridge (pressure difference measurement method):

$$x_e = x(1 + \gamma P_0 - \gamma p_1) + X_0\gamma p_1 - P_0 X_0\gamma \quad (21)$$

The above formula can generally be used for the compensation of a sensor bridge circuit.

2. Supply pressure compensation of the improved pressure measuring method, which was described in the manuscript:

Variant 1:
Input parameters are calibrated measured pressures $p_1$ and $p_2$:

$$x_e \left( X_1 + (\alpha p_1 - p_2 - F_1) \frac{X_2 - X_1}{F_2 - F_1} \right)(1 + \gamma P_0 - \gamma p_1) + X_0 \gamma p_1 - P_0 X_0 \gamma \quad (22)$$

Variant 2:
Input parameters are uncalibrated outputs (current or voltage) of the pressure sensors:

$$x_e = X_1 + (v\alpha - u - \gamma(v - V_0)(v\alpha - u - V_0\alpha - U_0) - F_1) \frac{X_2 - X_1}{F_2 - F_1} \quad (30)$$

in general form:

$$x_e = Av^2 + Bvu + Cv + Du + E \quad (36)$$

What is claimed is:

1. A method for pneumatic length measurement in which the medium used for the measurement is directed through a pre-nozzle and a measuring nozzle onto an impact plate and the distance of the impact plate from the measurement nozzle is determined from a change of a pressure $p_2$ between the pre-nozzle and the measurement nozzle, wherein pressure $p_1$ in front of the pre-nozzle is additionally measured and the length value resulting from the pressure measurement between the pre-nozzle and the measurement nozzle is corrected in dependence on the pressures $p_1$, $p_2$, and wherein as a correction, the following function is used for the calculation of the length:

$$f(p_1, p_2) = \alpha p_1 - p_2,$$

wherein $\alpha$: is a determinable constant.

2. A method in accordance with claim 1, wherein a preferable value for $\alpha$ is determined by measurement of the pressures $p_1$ and $p_2$ for, in each case, two different supply pressures A and B and calculation of $\alpha$ is accordance with the formula:

$$\alpha = \left( \frac{P_{2B} - P_{2A}}{P_{1B} - P_{1A}} \right)$$

with $P_{1A}$ being $p_1$ at the air supply pressure A
$P_{1B}$ being $p_1$ at the air supply pressure B
$P_{2A}$ being $p_2$ at the air supply pressure A
$P_{2B}$ being $p_2$ at the air supply pressure B.

3. A method in accordance with claim 2, wherein the two air supply pressures A and B for the determination of $\alpha$ are selected such that
A<$P_s$<B,
($P_s$-A)≈(B-$P_s$), and
$P_s$ is the supply pressure at which the corrected measurement is to later be carried out, and wherein the measurements to determine cc are carried out with the measuring nozzle a distance $X_0$ from an impact plate, where $X_0$ is the nominal distance between the measurement nozzle and an impact plate under test.

4. A method for pneumatic length measurement in which the medium used for the measurement is directed through a pre-nozzle and a measuring nozzle onto an impact plate and the distance of the impact plate from the measurement nozzle is determined from a change of a pressure $p_2$ between the pre-nozzle and the measurement nozzle wherein pressure $p_1$ in front of the pre-nozzle is additionally measured and the length value resulting from the pressure measurement between the pre-nozzle and the measurement nozzle is corrected in dependence on the pressures $p_1$, $p_2$, and wherein as a correction the following function is used for the calculation of the length:

$$x_e = x - \gamma \Delta p \Delta x$$

where $\Delta p = p_1 - P_0$ and $\Delta x = x - X_0$, with
 $x_e$ ... being the corrected length value
 $X_0$ ... being the distance of the impact plate from the measurement nozzle
 x ... being the length value calculated from $p_2$
 $P_0$ ... being the desired value of $p_1$ at which the measurement is later to be carried out, and
 $\gamma$ ... being a determinable constant.

5. A method in accordance with claim 4, wherein a preferable value for $\gamma$ is determined by calculating the expected spacing between the measurement nozzle and the impact plate while varying the actual spacing and pressure $p_1$, and calculating $\gamma$ in accordance with the formula $$\gamma = \frac{X_{2Ph} - X_{2P0}}{(P_h - P_0)(X_{2Ph} - X_{0P0})}$$

where
 $X_{2Ph}$ ... is the calculated length value at the known predetermined spacing $X_2$ and the pressure $P_h$
 $X_{2P0}$ ... is the calculated length value at the known predetermined spacing $X_2$ and pressure $P_0$
 $X_{0P0}$ ... is the calculated length value at the known predetermined spacing $X_0$ and pressure $P_0$
 $X_0$ ... is the nominal expected distance between the measurement nozzle and the impact plate to be later measured and
 $P_0$ ... is the desired value of $p_1$ at which the measurement is later to be carried out.

6. A method in accordance with claim 5, characterized in that $X_0$ is selected as the nominal expected distance between the measurement nozzle and the impact plate to be later measured and $P_0$ as the desired value of $p_1$ at which the measurement is later to be carried out.

7. A method in accordance with claim 1, wherein the calculation of the corrected length value takes place in accordance with the formula $$x_e = X_1 + (f_e(v, u) - F_1) \frac{X_2 - X_1}{F_2 - F_1},$$

wherein
 $x_e$ ... is the corrected length value
 $X_1, X_2$ ... are predetermined values of x
 $f(v, u) = \alpha v - u$
 $\gamma$ ... is a constant
 $V_u$ ... is v at $X_0$ and $P_0$ $$\alpha = \left( \frac{u_h - u_i}{v_h - v_i} \right),$$

wherein
 $u_h$ ... is u at $p_1 = P_h$
 $u_i$ ... is u at $p_1 = P_1$
 $v_h$ ... is v at $p_1 = P_h$
 $v_i$ ... is v at $p_1 = P_I$
 $P_h$ ... is a predetermined value of $p_1 > P_0$ $P_1$ ... is a predetermined value of $p_1 < P_0$
$X_0$ ... is a predetermined value of x at which the measurement is to take place (zero position)
$P_0$ ... is a value of $p_1$ at which the measurement is to take place (zero position)
$f_e(v, u) = f(v, u) - \gamma \Delta v \Delta f(v, u)$
$\Delta v = v - V_u$
$\Delta f(v, u) = v\alpha - u - F_0$
$F_1 = f_e(v, u)$ at the distance $x = X_1$
$F_2 = f_e(v, u)$ at the distance $x = X_2$
$x_e$ ... is a corrected length value
v ... is an uncalibrated value of the pressure sensor before the pre-nozzle
u ... is an uncalibrated value of the pressure sensor between the pre-nozzle and the measurement nozzle and
$F_0$ ... is the function value at $x = X_0$ and $p = P_0$.

* * * * *